(12) United States Patent
Nakajo et al.

(10) Patent No.: US 6,237,542 B1
(45) Date of Patent: May 29, 2001

(54) HEAT RECOVERY BOILER AND HOT BANKING RELEASING METHOD THEREOF

(75) Inventors: Mitsunobu Nakajo, Yokohama; Shuichi Honma, Kawasaki; Tomoyoshi Joraku, Kunitachi, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/494,733

(22) Filed: Jan. 31, 2000

(30) Foreign Application Priority Data

Jan. 29, 1999 (JP) ................................. 11-023022
Nov. 30, 1999 (JP) ................................. 11-340712

(51) Int. Cl.⁷ ........................................... F22D 1/02
(52) U.S. Cl. ........................... 122/7 R; 122/420; 122/460
(58) Field of Search ..................... 122/1 C, 7 R, 122/420, 422, 460, 469, 477; 422/168

(56) References Cited

U.S. PATENT DOCUMENTS

| | | | |
|---|---|---|---|
| 4,501,233 | * | 2/1985 | Kusaka .................................. 122/420 |
| 4,799,461 | * | 1/1989 | Shigenaka et al. ................... 122/1 C |
| 5,419,285 | * | 5/1995 | Gurevich et al. .................... 122/477 |

FOREIGN PATENT DOCUMENTS 11-82916 * 3/1999 (JP).
11-304101 * 11/1999 (JP).

* cited by examiner

Primary Examiner—Gregory Wilson
(74) Attorney, Agent, or Firm—Foley & Lardner (57) ABSTRACT

A heat recovery boiler has a casing, a superheater having a heat transfer pipe, an evaporator provided with a steam drum, and an economizer. The superheater, evaporator and economizer arranged in the casing along a flow of an exhaust gas from the combustion system. A lead pipe connects an inlet of the pipe line to the steam drum while a superheated steam pipe line connects an outlet of the pipe line to the steam drum of the evaporator. A drain pipe is connected to the pipe line while a superheater bypass pipe having a superheater bypass valve has a first end operatively connected to the steam drum and a second end connected to the superheated steam pipe. With this arrangement, the superheater bypass valve incorporated into the superheater bypass pipe and a drain valve in the drain pipe are opened. Force is applied to water collected in the bottom of the superheater by passing saturated steam generated from the steam drum through the lead pipe and the superheater bypass pipe. Drain water is blown out of the system through the drain valve.

15 Claims, 12 Drawing Sheets

| CORRESPONDING TO PART NO. IN FIG. 1 | | OPERATION OF VALVE AND EQUIPMENT |
|---|---|---|
| 43 | NON-CONDENSABLE GAS MAIN VALVE | OPEN ─── CLOSE |
| 45 | NON-CONDENSABLE GAS STOP VALVE | OPEN ─── CLOSE |
| 38 | FEED WATER PUMP | START |
| 39 | ECONOMIZER INLET FEED WATER VALVE | OPEN |
| 40 | FEED WATER FLOW CONTROL VALVE | OPEN ─── CLOSE ─── OPEN |
| 32 | SUPERHEATER OUTLET STEAM VALVE | OPEN |
| 47 | SUPERHEATER BYPASS VALVE | OPEN ─── CLOSE |
| 35 | DRAIN VALVE | OPEN ─── CLOSE |
| 25 | DAMPER | OPEN |
| 24 | STEAM TURBINE (ROTATING SPEED) | START |
| 23 | GAS TURBINE (ROTATING SPEED) | START |
| 33 | STEAM REGULATING VALVE | OPEN |

HEAT RECOVERY BOILER AND HOT BANKING RELEASING METHOD THEREOF

BACKGROUND OF THE INVENTION

The present invention relates to a heat recovery boiler and a hot banking releasing method thereof, and more particularly, to a heat recovery boiler for preventing hammering generated at a time of blowing a drain water of a superheater from a system such as power generation plant including the heat recovery boiler and a hot banking releasing method thereof.

In a recent thermal power generation plant, a conventional (steam turbine only) power generation plant has been replaced by a combined cycle power generation plant in the trend of high efficiency operation, diversified operations and shortening of starting time. This combined cycle power generation plant is a combination of Brayton cycle of gas turbine plant and Rankine cycle of steam turbine plant and mainly comprises an air compressor, a gas turbine, a heat recovery boiler and a steam turbine.

In these principal components, the waste heat recovery boiler corresponds to a heat recovery steam generator in a conventional power generation plant and uses an exhaust gas (waste heat) from the gas turbine plant as a heat source and feed water from the steam turbine plant as a source to be heated. The heat recovery boiler is designed so as to generate steam by heating the source to be heated and supply the generated steam to the steam turbine plant as a driving source.

In the combined cycle power generation plant, starting operation and stopping operation are repeated frequently by virtue of the convenience of quick start and stop of the gas turbine plant, which is known as Daily Start-Stop (DSS) operation or Weekly Start-Stop (WSS) operation. Furthermore, in the combined cycle power generation plant, for effective utilization of excess heat of steam at the time of stopping the operation of the power generation plant, an outlet damper is closed, and preheated drain water or feed water is enclosed in the steam drum, an evaporator or a heat exchanger, which is known as hot banking. In such hot banking, while the gas turbine plant and the steam turbine plant are shut down, the drum water is maintained at a high temperature in a vessel, and therefore, when the operation is re-started, the steam is supplied into the steam turbine plant without delay to the quick start of the gas turbine plant, which assists and contributes to the quick starting.

Figure 9:
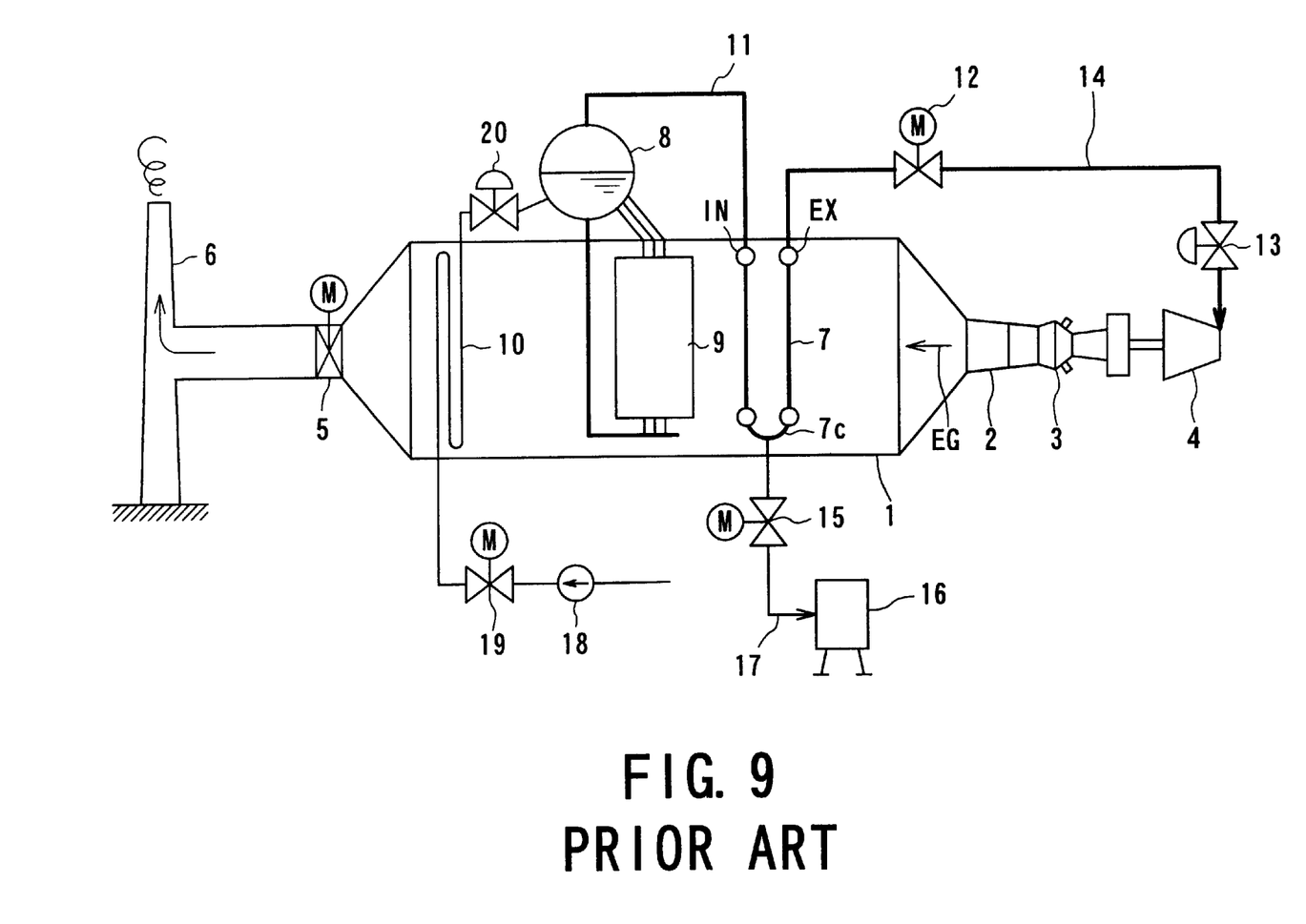
FIG. 9 is a schematic block diagram showing a conventional heat recovery boiler.

FIG. 9 is a schematic block diagram showing an example of a conventional heat recovery boiler (heat recovery steam generator) through the hot banking.

In this waste heat recovery boiler, a casing 1 having a long structure (generally rectangular in section) has an inlet side connected to a gas turbine 3 through a duct 2 and an outlet side connected to a stack 6 through a damper 5. The gas turbine 3 and the steam turbine 4 are coupled through a shaft.

In the heat recovery boiler, the long casing 1 incorporates numerous heat exchangers such as a superheater 7, an evaporator 9 with a steam drum 8, and an economizer 10 installed along the flow of exhaust gas EG (waste heat) supplied from the gas turbine 3.

The superheater 7 is disposed so as to cross the flow of the exhaust gas EG and provided with a connection (lead) pipe 11 for guiding a saturated steam from a steam drum 8 at the steam inlet (entrance) side (IN) and with a superheated steam valve 12 and a superheated steam pipe 14 to be connected to the steam turbine 4 through a steam control (governing) valve 13 at the steam outlet (exit) side (EX). Furthermore, in a bottom portion of a connection pipe line 7c of the bottom of the superheater, a drain pipe 17 to be connected to a blow-down tank 16 is provided with a drain valve 15.

The economizer 10 is accommodated in the long casing 1 and positioned at the downstream side of the exhaust gas of the evaporator 9. The economizer 10 is provided with a feed water pump 18 and a feed water stop valve 19 at an inlet side thereof and an outlet side thereof is connected to the steam drum 8 through a feed water flow control valve 20.

In the heat recovery boiler having such constitution, in a loaded operation, the drum water in the steam drum 8 exchanges heat with the exhaust gas EG during spontaneous circulation in the evaporator 9, and a gas-liquid two-phase flow is formed, and only the steam relatively light in specific gravity of this gas-liquid two-phase flow is supplied to the superheater 7 through a lead or connection pipe 11 and becomes a superheated steam, which is supplied to the steam turbine 4 through a superheated steam valve 12, the superheated steam pipe 14 and the steam control valve 13.

At a time of stopping the operation, the heat recovery boiler closes the damper 5 and also closes the superheated steam valve 12, the drain valve 15 and the feed waster stop valve 19, and hot water is enclosed in the superheater 7, the steam drum 8 and the economizer 10 to establish the hot banking as standby to be ready for the restart of the operation.

The heat recovery boiler shown in FIG. 9 has several problems, including the hammering at the time of releasing the hot banking state or condition.

Figure 10:
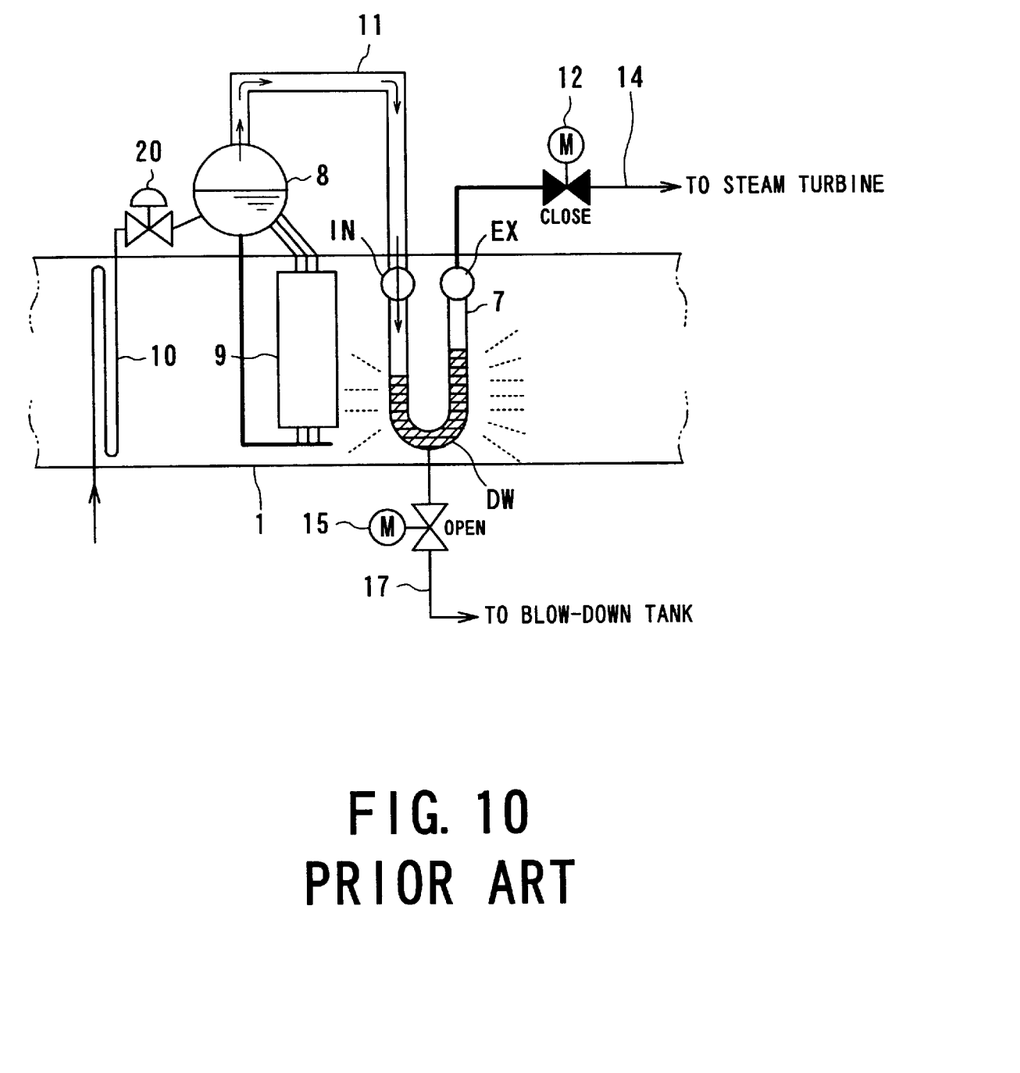
FIG. 10 is a diagram for an explanation of a forming process of drain water collected in a bottom portion of a superheater in the conventional heat recovery boiler.

The heat recovery boiler has a vertical meandering pipe line as the superheater 7, and during the hot banking operation, as shown in FIG. 10, while the saturated steam generated from the steam drum 8 flows into the superheater 7 through the connection pipe 11, heat is released spontaneously and the temperature declines and then turns out as a drain water DW, which is often collected in the bottom of the superheater 7. At this time, the heat recovery boiler increases in the volume of water due to inductive force applied in addition to the natural convection of the saturated steam from the steam drum 8 in accordance with the decreasing in volume of the drain water DW.

Figure 11:
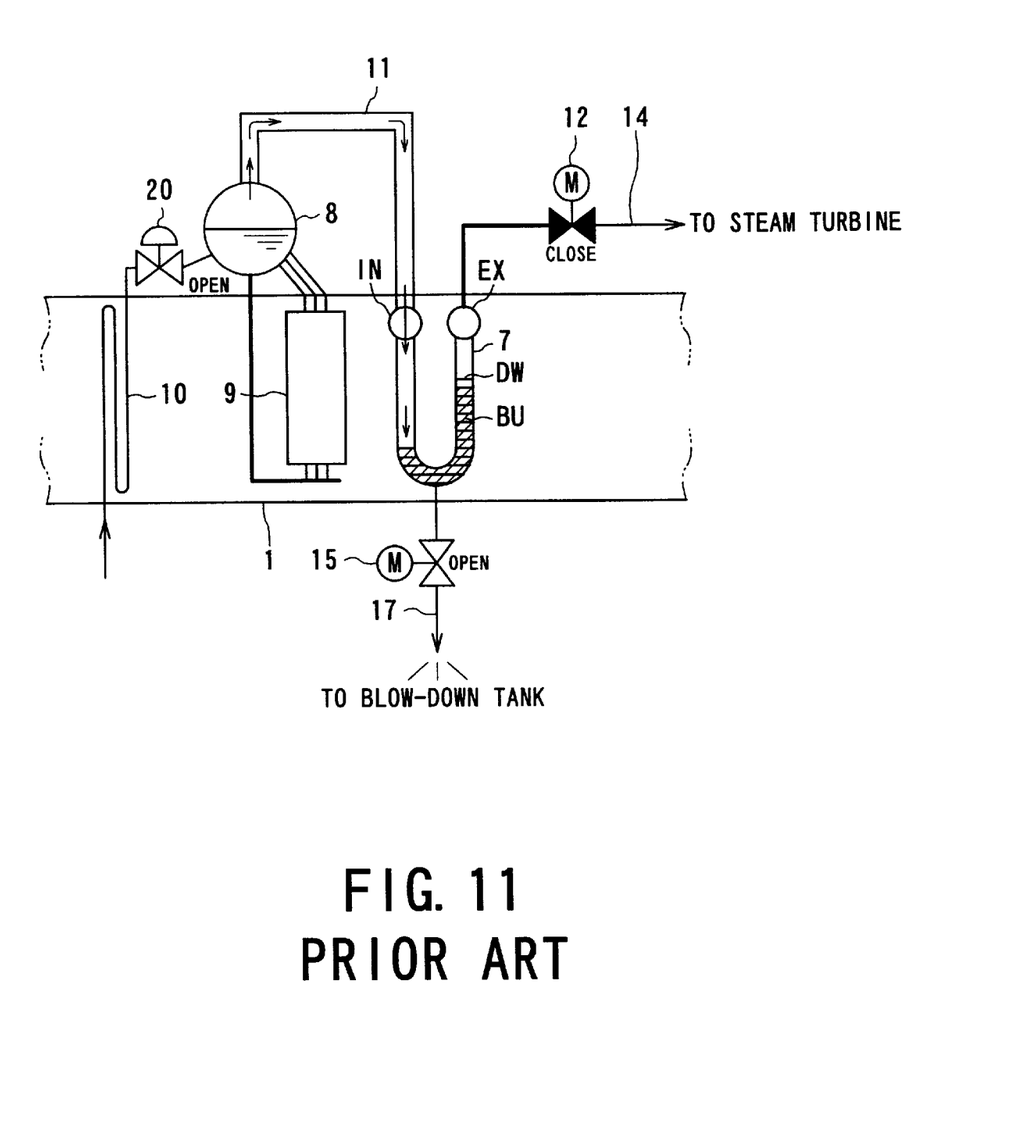
FIG. 11 is a diagram for an explanation of behavior of the drain water when blowing the drain water collected in the bottom of the superheater out of a plant at the time of releasing the hot banking in the conventional heat recovery boiler.

If the hot banking is released and the superheated steam valve 12 is opened in the heat recovery boiler while the drain water DW is collected in the bottom of the superheater 7, a pressure difference is produced due to residual pressure of the steam drum 8 between the steam drum 8 and the superheater 7, and this pressure difference causes to press the drain water DW. A jet collision force may be applied to the meandering parts and elbows of the superheated steam pipe 14 and the piping system may be exposed to erosion, damage or other accident. Accordingly, in the waste heat recovery boiler, prior to releasing of the hot banking, as shown in FIG. 11, the drain valve 15 of the drain pipe 17 is opened and the drain water DW is then blown out into the external blow-down tank 16.

Figure 12:
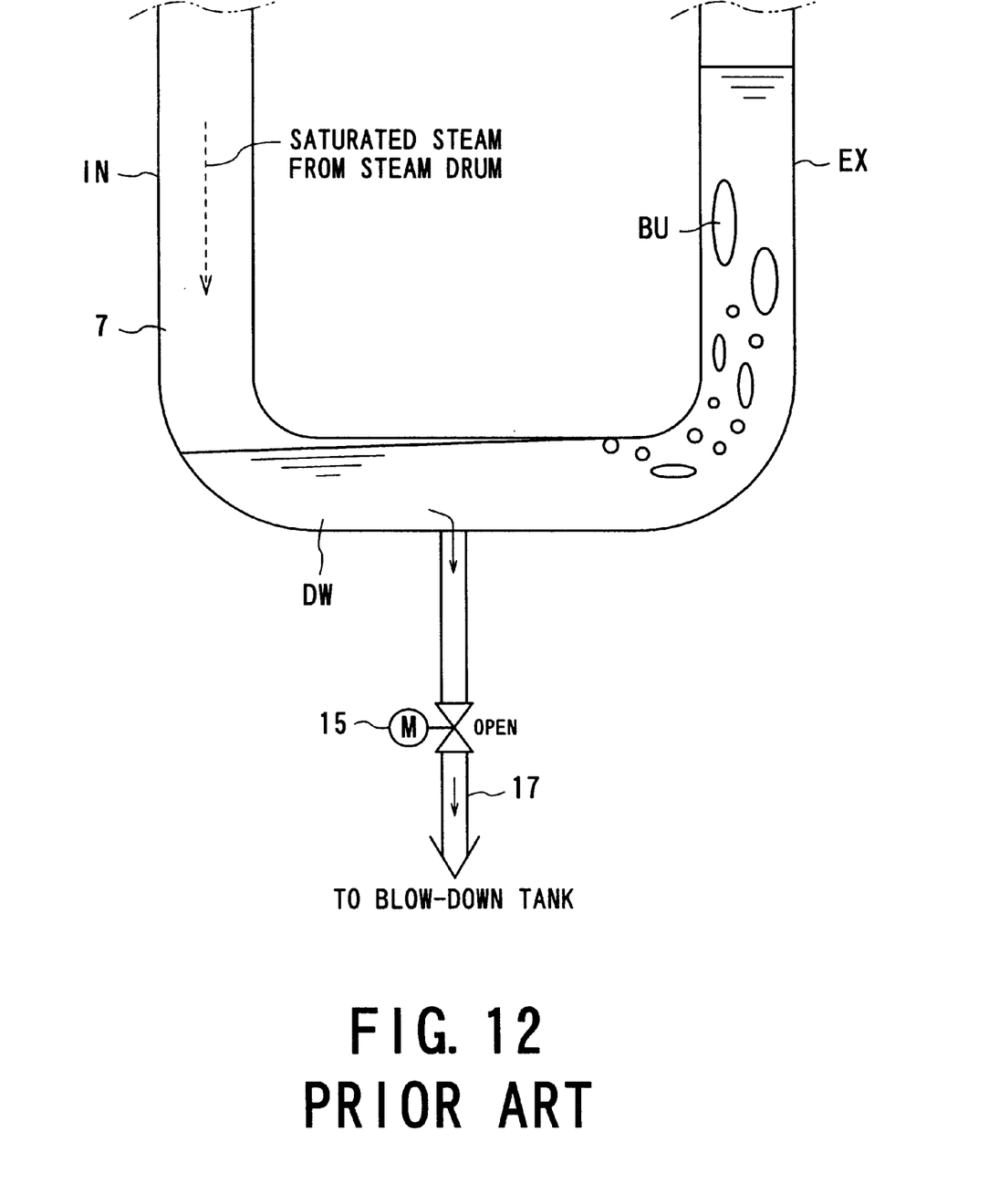
FIG. 12 is a diagram for an explanation of generation of bubbles formed when blowing the drain water collected in the bottom of the superheater from the plant at the time of releasing the hot banking in the conventional heat recovery boiler.

However, at a time of blowing the drain water DW out of the system, the drain water DW is discharged quickly from the inlet (IN) side of the superheater 7, but is slow in discharge from the outlet (EX) side because of the resistance of the meandering piping arrangement. At this time, bubbles BU are formed when the drain water DW at the inlet (IN) side flows into the drain pipe 17. The bubbles BU are grown when getting into the drain water DW stagnant at the outlet (EX) side of the superheater 7 as shown in FIG. 12, and then disappear as the saturated steam from the steam drum 8 contacts repeatedly to the drain water DW. At this time, due to the contact of saturated steam to the drain water DW and extinction of bubbles BU, the hammering (vibration due to collision of energy) takes place. When this hammering phenomenon is increased, it may give unexpected damages to the piping, piping supports, piping heat insulator and other piping systems.

SUMMARY OF THE INVENTION

An object of the present invention is to eliminate defects or drawbacks encountered in the prior art mentioned above and to provide a heat recovery boiler capable of maintaining piping arrangement in a stable state by preventing occurrence of hammering at a time of blowing a drain water collected at the time of releasing hot banking and also provide a hot banking releasing method thereof.

This and other objects can be achieved according to the present invention by providing, in one aspect, a heat recovery boiler having an inlet side operatively connected to a combustion system and an outlet side operatively connected to an exhaust system, comprising:

a casing;

a superheater constituted by a pipe line constituting a heat transfer pipe;

an evaporator provided with a steam drum;

an economizer, the superheater, the evaporator and the economizer being operatively arranged in the casing along a flow of an exhaust gas from the combustion system;

a connection pipe connecting an inlet side of the pipe line constituting the superheater to the steam drum;

a superheated steam pipe line connecting an outlet side of the pipe line constituting the superheater to the steam drum of the evaporator;

a drain pipe operatively connected to the pipe line constituting the superheater; and a superheater bypass pipe incorporated with a superheater bypass valve and having one end operatively connected to the steam drum and another one end operatively connected to the superheated steam pipe.

In preferred embodiments of this aspect, the pipe line constituting the superheater is composed of at least two pipe sections which are connected to each other by means of a U-shaped connection pipe at bottom portions thereof in an installed state of the boiler. At least one of the pipe line and the U-shaped connection pipe is assembled in a panel in shape of a form.

The one end of the superheater bypass pipe is directly connected to the steam drum, or the one end of the superheater bypass pipe is indirectly connected to the steam drum by way of a non-condensable gas system.

In another aspect of the present invention, there is provided a heat recovery boiler having an inlet side operatively connected to a combustion system and an outlet side operatively connected to an exhaust system, comprising:

a casing;

a superheater constituted by a pipe line forming a heat transfer pipe;

an evaporator provided with a steam drum;

an economizer, the superheater, the evaporator and the economizer being operatively arranged in the casing along a flow of an exhaust gas from the combustion system;

a lead pipe connecting an inlet side of the pipe line constituting the superheater to the steam drum;

a superheated steam pipe line connecting an outlet side of the pipe line constituting the superheater to the steam drum of the evaporator;

a drain pipe operatively connected to the pipe line through a bottom connection pipe;

a superheater bypass pipe incorporated with a superheater bypass valve, the pipe line constituting the superheater being composed of one straight pipe line, the straight pipe line having an outlet side is connected to the superheated steam pipe through a connection portion which is arranged at a portion downstream side of a connection portion between the drain pipe and the bottom connection pipe, the connection portion between the superheated steam pipe and the pipe line being formed with a rising portion, and the superheater bypass pipe having one end operatively connected to the steam drum and another one end operatively connected to a portion downstream side of the rising portion.

In preferred embodiments of this aspect, at least one of the pipe line and the bottom connection pipe is assembled in a panel in shape of a form.

The one end of the superheater bypass pipe is directly connected to the steam drum, or the one end of the superheater bypass pipe is indirectly connected to the steam drum by way of a non-condensable gas system.

In a further aspect of the present invention, there is provided a heat recovery boiler having an inlet side operatively connected to a combustion system and an outlet side operatively connected to an exhaust system, comprising:

a casing;

a superheater constituted by a pipe line forming a heat transfer pipe;

an evaporator provided with a steam drum;

an economizer, the superheater, the evaporator and the economizer being arranged in the casing along a flow of an exhaust gas from the combustion system;

a lead pipe connecting an inlet side of the pipe line constituting the superheater to the steam drum;

a superheated steam pipe line connecting an outlet side of the pipe line constituting the superheater to the steam drum of the evaporator;

a drain pipe operatively connected to the pipe line constituting the superheater; and a superheater bypass pipe incorporated with a superheater bypass valve and having one end operatively connected to the steam drum and another one end operatively connected to the superheated steam pipe, the pipe line being composed of at least four pipe line sections which are connected by means of head connection pipes and bottom connection pipes respectively at head side portions and bottom side portions of the pipe line sections totally in a meandering fashion, and the pipe line being incorporated with a superheater intermediate bypass pipe through which at least one of saturated steam and non-condensable gas is supplied.

In preferred embodiments of this aspect, at least one of the pipe line, the head communication pipes and the bottom connection pipes is assembled in a panel in shape of a form.

The one end of the superheater bypass pipe is directly connected to the steam drum, or the one end of the superheater bypass pipe is indirectly connected to the steam drum by way of a non-condensable gas system.

In a still further aspect of the present invention, there is provided a hot banking releasing method of a heat recovery boiler, which has an inlet side operatively connected to a combustion system and an outlet side operatively connected to an exhaust system and which comprises: a casing; a superheater constituted by a pipe line forming a heat transfer pipe; an evaporator provided with a steam drum; an economizer, the superheater, the evaporator and the economizer being operatively arranged in the casing along a flow of an exhaust gas from the combustion system; a lead (connection) pipe connecting an inlet side of the pipe line constituting the superheater to the steam drum; a superheated steam pipe line connecting an outlet side of the pipe line constituting the superheater to the steam drum of the evaporator; a drain pipe operatively connected to the pipe line constituting the superheater; and a superheater bypass pipe incorporated with a superheater bypass valve and having one end operatively connected to the steam drum and another one end operatively connected to the superheated steam pipe, the hot banking releasing method being for enclosing exhaust gas from the combustion system in the shell and releasing the hot banking while maintaining feed water in the shell at a high temperature, and the hot banking releasing method comprising the steps of:
opening the superheater bypass valve incorporated to the superheater bypass pipe;
opening a drain valve provided for the drain pipe;
applying a pressing force to water collected in the bottom of the superheater by passing saturated steam generated from the steam drum through the connection pipe and the superheater bypass pipe; and
blowing drain water out of a plant through the drain valve.

In a still further aspect of the present invention, there is also provided a hot banking releasing method of a heat recovery boiler, which has an inlet side operatively connected to a combustion system and an outlet side operatively connected to an exhaust system and which comprises: a casing; a superheater constituted by a pipe line forming a heat transfer pipe; an evaporator provided with a steam drum; an economizer, the superheater, the evaporator and the economizer being operatively arranged in the casing along a flow of an exhaust gas from the combustion system; a connection pipe connecting an inlet side of the pipe line constituting the superheater to the steam drum; a superheated steam pipe line connecting an outlet side of the pipe line constituting the superheater to the steam drum of the evaporator; a drain pipe operatively connected to the pipe line constituting the superheater; and a superheater bypass pipe incorporated with a superheater bypass valve and having one end operatively connected to the steam drum by way of a non-condensing gas system and another one end operatively connected to the superheated steam pipe, the hot banking releasing method being for enclosing exhaust gas from the combustion system in the casing and releasing the hot banking while maintaining feed water in the casing at a high temperature, and the hot banking releasing method comprising the steps of, at a time when a saturated steam pressure of a steam drum is less than a predetermined set pressure:
opening a valve provided for the non-condensable gas system;
branching the inlet side of the superheater from the connection pipe connected to the steam drum;
opening the superheater bypass valve incorporated to the superheater bypass pipe;
opening a drain valve provided for the drain pipe provided in the bottom of the superheater;
applying a pressing force to drain water collected in the bottom of said superheater by passing a non-condensable gas from the non-condensable gas system through the connection pipe and the superheater bypass pipe;
blowing drain water out of the system through the drain valve;
closing the valve of the non-condensable gas system;
closing again the drain valve temporarily; and
blowing the non-condensable gas out of a plant through the drain valve.

As described above, according to the heat recovery boiler and the hot banking releasing method of the present invention, at the time of the the hot banking release, since the saturated steam generated from the steam drum is applied as pressing force to the drain water collected in the bottom of the inlet side and outlet side of the superheater, the drain water collected in the bottom of the superheater can be easily blown out, and the generation of the hammering of the drain water can be suppressed.

Furthermore, when the pressure of the saturated steam generated from the steam drum is low, non-condensing gas is applied as pressing force to the drain water collected in the bottom of the inlet side and the outlet side of the superheater, and therefore, the drain water collected in the bottom of the superheater can be securely blown out, and the generation of the hammering of the drain water can be suppressed.

The nature and further characteristic features of the present invention will be made further clear from the following descriptions made with reference to the accompanying drawings.

DESCRIPTION OF THE PREFERRED EMBODIMENTS

Preferred embodiments of the heat recovery boiler according to the present invention and a hot banking releasing method thereof will be described hereunder with reference to the accompanying drawings and reference numerals given in the drawings.

Figure 1:
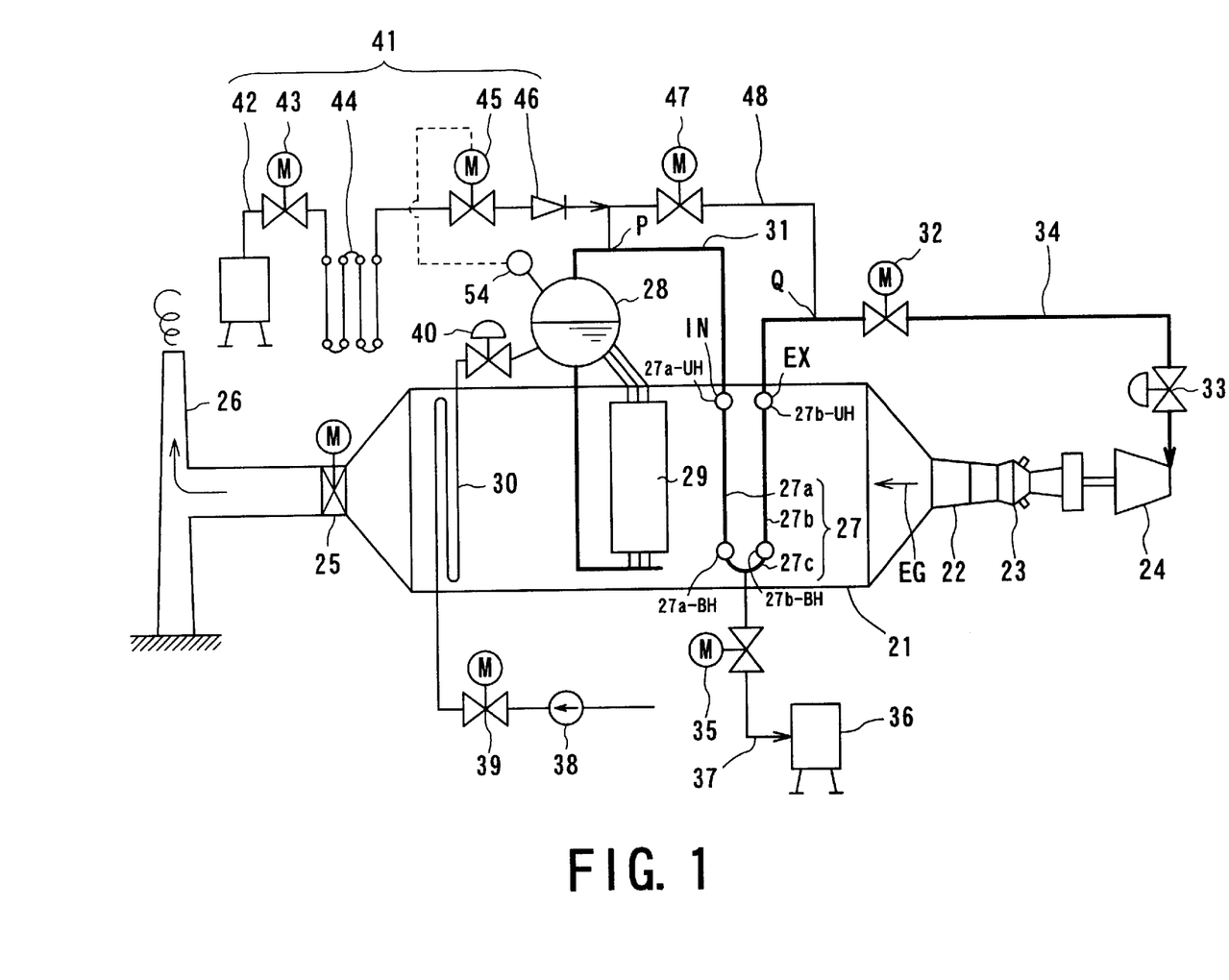
FIG. 1 is a schematic block diagram showing a first embodiment of a heat recovery boiler according to the present invention.

FIG. 1 is a schematic block diagram showing a first embodiment of a heat recovery boiler, which may be called a heat recovery steam generator, incorporated in a power generation plant including a combustion system to which the heat recovery boiler is generally connected, and a hot banking releasing method thereof according to the present invention is also described in connection with the heat recovery boiler.

The heat recovery boiler of this embodiment has a casing 21 formed in a lateral long structure generally rectangular in section and is provided with an inlet side connected to a gas turbine 23 coupled directly with a steam turbine 24 through a duct 22 and with an outlet side connected to a stack 26 through a damper 25.

The heat recovery boiler incorporates a superheater 27, an evaporator 29 with a steam drum 28 and an economizer 30 formed along the flow of the exhaust gas (waste heat) EG supplied from the gas turbine 23 into the lateral long casing 21.

The superheater 27 is disposed between bottom headers 27a-BH and 27b-BH of straight (linear) pipe lines 27a, 27b, in form of heat transfer pipes or tubes, so as to cross the flow direction of the exhaust gas EG, and communicated, for example, by means of a U-shaped connection (communication) pipe 27c. The superheater 27 has one header (IN) side 27a-UH communicating with one end of a lead (communication) pipe 31 for guiding the saturated steam from the steam drum 28, and other header (EX) side 27b-UH communicating with a superheated steam pipe 34 connected to the steam turbine 24 through a superheater outlet steam valve 32 and a steam control valve 33. The superheater 27 has a drain pipe 37 connected to a blow-down tank 36 through a drain valve 35 communicating with the bottom of the connection pipe 27c.

The superheater 27 is often assembled in a kind (form) of panel formed of pipe lines 27a and 27b, connection pipe 27c, and others. When the pipe lines 27a, 27b are assembled into a panel, lot production is realized, and therefore, it is easy to install in the shell 21, being very effective in consideration of the cost, duration of installation, and labor of workers. Moreover, the pipe lines 27a, 27b are formed of solid fin tubes or special shape fins, for example, serrated fin tubes to effectively perform functions of heat transfer tubes or pipes.

The economizer 30 positioned at the damper 25 side of the casing 21 is equipped with a feed water pump 38 and an economizer inlet feed water valve 39 at its inlet side, and its outlet side is connected to the steam drum 28 through a feed water flow control valve 40. The steam drum 28 is provided with a pressure gauge 54 which is actuated when the internal pressure drops below a predetermined set pressure, thereby to open a non-condensable gas (non-condensing gas) stop valve 45 in a non-condensable (non-condensing) gas system 41 described below. Herein, the predetermined set pressure is the saturated steam pressure for blowing the drain collected in the bottom of the superheater 27 out of the system (power generation plant) when the re-starting (resuming) operation from the stopping operation.

To the intermediate portion of the lead pipe 31 communicating the steam drum 28 with the superheater 27, the non-condensable gas system 41 is connected. This non-condensable gas system 41 operates when the internal pressure of the steam drum 28 drops and drain cannot be discharged by steam. The non-condensable gas system 41 includes, sequentially along the flow of the non-condensable gas, a non-condensable gas generator 42, a non-condensable gas main valve 43, an evaporator 44, a non-condensable gas stop valve 45, and a check valve 46, and a non-condensable gas containing moisture from the non-condensable gas generator 42 is evaporated in the evaporator 44, and dried non-condensable gas is generated. Herein, the non-condensable gas stop valve 45 opens when the pressure gauge 54 is actuated, and supplies non-condensable gas into the lead pipe 31 and a superheater bypass pipe 48 described below. In this embodiment, meanwhile, the non-condensing gas system 41 is provided, but the non-condensable gas system 41 may not be provided in another modified case. That is, the non-condensable gas system 41 is provided as occasion demands.

The superheater 27 has the superheater bypass pipe 48 for communicating its inlet (IN) side, that is, the header 27a-UH side with its outlet (EX) side, that is, the header 27b-UH side. This superheater bypass pipe 48 has its inlet end P connected to an intermediate portion of the lead pipe 31, and its outlet end Q connected to the outlet (EX) side of the superheater 27 through a superheater bypass valve 47 provided in the intermediate portion.

With this constitution, the hot banking of the heat recovery boiler will be described hereunder.

The hot banking of the waste heat recovery boiler of the embodiment is classified into hot banking start and hot banking release.

(1) Hot Banking Start

The hot banking starts when the gas turbine 23 stops.

Figure 2:
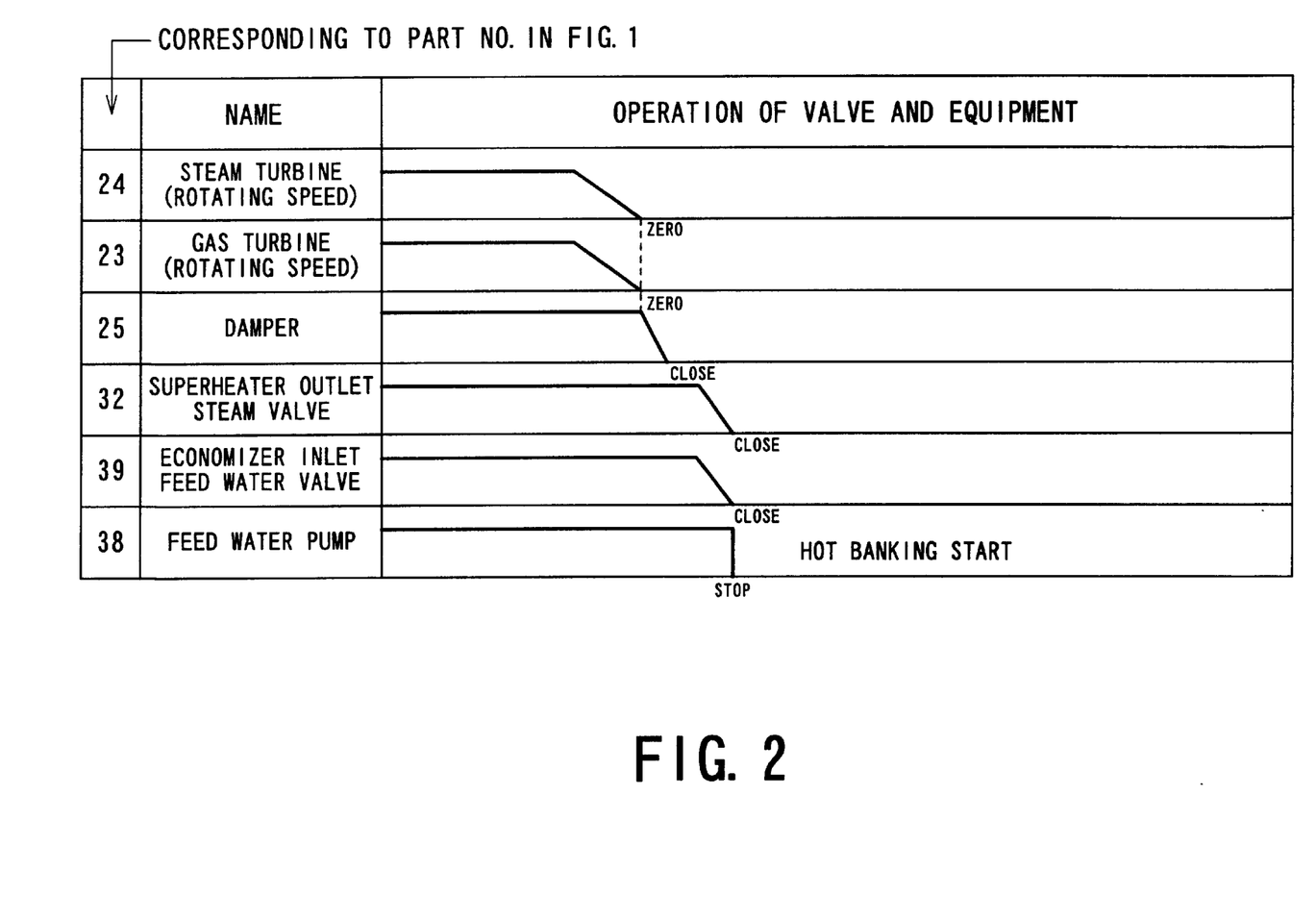
FIG. 2 is a time chart for explaining start of hot banking of the heat recovery boiler of the present invention.

That is, when the rotating speed of the steam turbine 24 and the rotating speed of the gas turbine 23 become zero and exhaust gas EG no longer flows, the damper 25 is closed. Then, the superheater outlet steam valve 32 is closed, the economizer inlet feed water valve 39 is closed, the feed water pump 38 is stopped and the hot banking is started. In this state, the exhaust gas supplied from the gas turbine 23 is enclosed in the casing 21 and the feed water is maintained at a high temperature.

Thus, in this embodiment, by the hot banking of the heat recovery boiler, the feed water in the casing 21 is maintained at a high temperature, so that the quick starting is supported and encouraged at the time of the next re-starting operation of the gas turbine 23 and the steam turbine 24.

(2) Hot Banking Release

Figure 3:
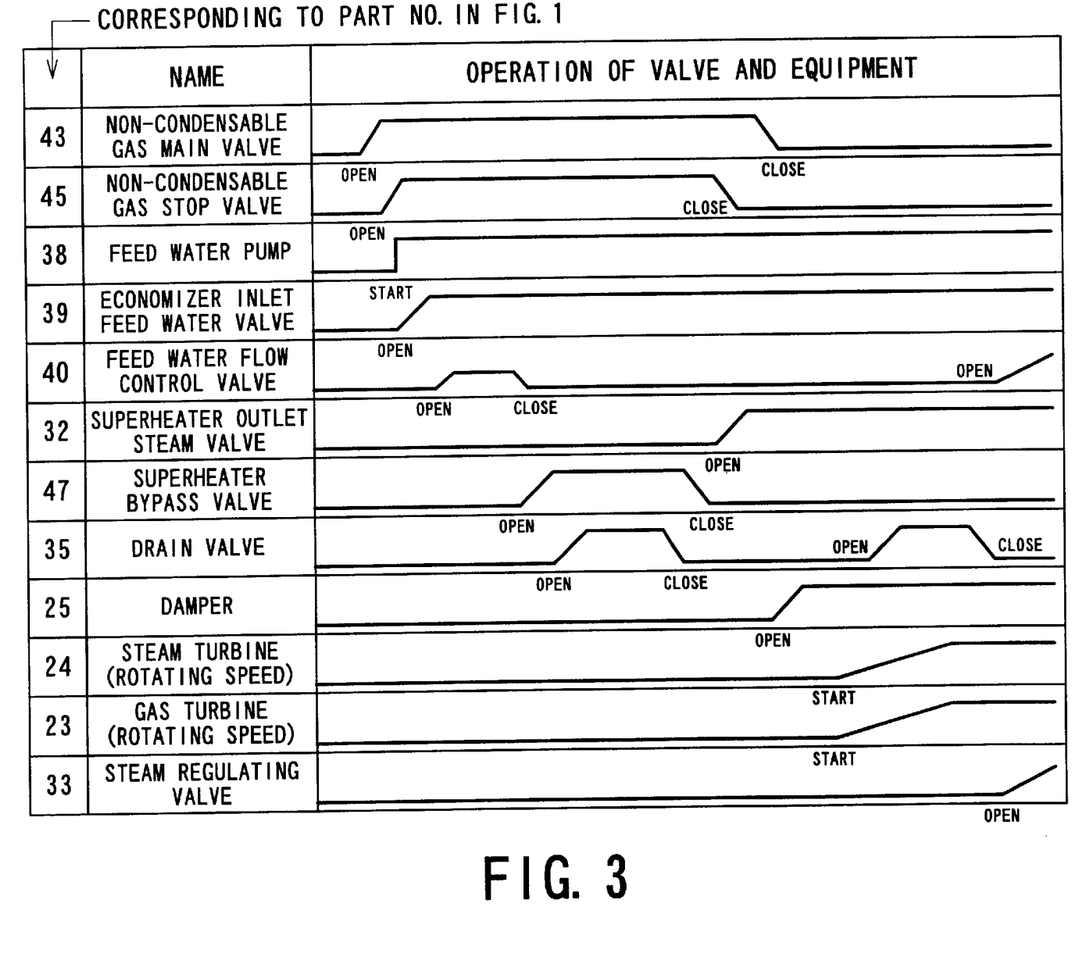
FIG. 3 is a time chart for explaining release of the hot banking of the heat recovery boiler of the present invention.

In the case of releasing the hot banking state or condition, when the pressure gauge 54 provided in the steam drum 28 operates, that is, when the saturated steam pressure of the steam drum 28 drops below a predetermined set pressure, as shown in the time chart in FIG. 3, the non-condensable gas system 41 is opened until the end of the hot banking release, the feed water pump 38 is operated, the economizer inlet feed water valve 39 is opened, and the feed water flow control valve 40 is opened to a proper degree, so that the water level in the steam drum 28 is elevated. Thereafter, the superheater bypass valve 47 is opened, and the drain valve 35 is opened temporarily. The drain valve 35 is once closed after blowing down the drain out of the system, and thereafter, the superheater outlet steam valve 32 is opened, the damper 25 is opened, the gas turbine 23 and steam turbine 24 are started, and finally, the steam control valve 33 and the feed water control valve 40 are opened.

Thus, at the time of releasing the hot banking, when the saturated steam pressure of the steam drum 28 drops below the predetermined set pressure, the non-condensable gas from the non-condensable gas system 41 is supplied into the headers 27a-UH, 27b-UH at the inlet (IN) side and outlet (EX) side of the superheater 27 through the lead pipe 31 and superheater bypass pipe 48. The pressing force is then applied to the drain water DW collected in the bottom of the pipe lines 27a, 27b of the superheater 27. Thus, the drain water DW may be easily blown into the blow-down tank 36 through the drain valve 35 and drain pipe 37.

According to this embodiment, therefore, since at least one of the steam and non-condensable gas from the inlet (IN) side and outlet (EX) side of the superheater 27 is supplied to apply a pressing force to easily blow out the drain water DW into the blow-down tank 36, the occurrence of the hammering of the drain water DW is securely suppressed and unexpected damage of piping can be prevented.

Figure 4:
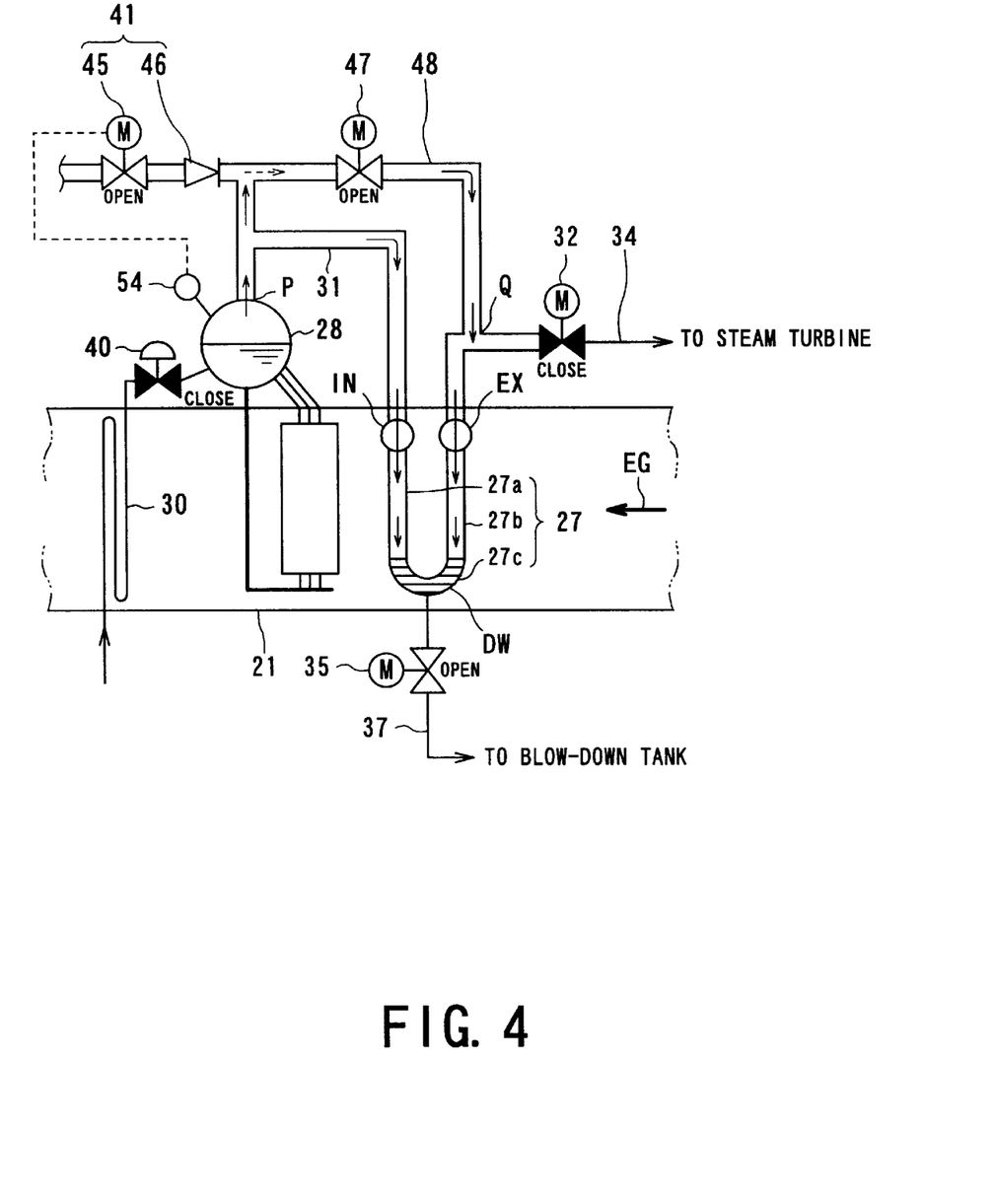
FIG. 4 is a partially cut-away block diagram showing a first modified example of the first embodiment of the heat recovery boiler of the present invention.

Meanwhile, according to the present embodiment, the inlet end P of the superheater bypass pipe 48 is connected to the intermediate portion of the lead pipe 31, but not limited to this example, as shown in FIG. 4, for instance, the inlet end P of the superheater bypass pipe 48 may be connected to the steam drum 28 commonly with the lead pipe 31, and the outlet end Q thereof may be connected to the outlet (EX) side of the superheater 27. When the inlet end P of the superheater bypass pipe 48 is connected directly to the steam drum 28, if the pressure of the saturated steam generated from the steam drum 28 is low, the saturated steam may be induced by the inductive force of the non-condensable gas from the non-condensable gas system 41 to form a mixed gas. The thus mixed gas applies a pressing force to the drain water DW collected in the bottom of the superheater 27, thus being advantageous because the drain water DW may be easily blown out into the blow-down tank 36.

Figure 5:
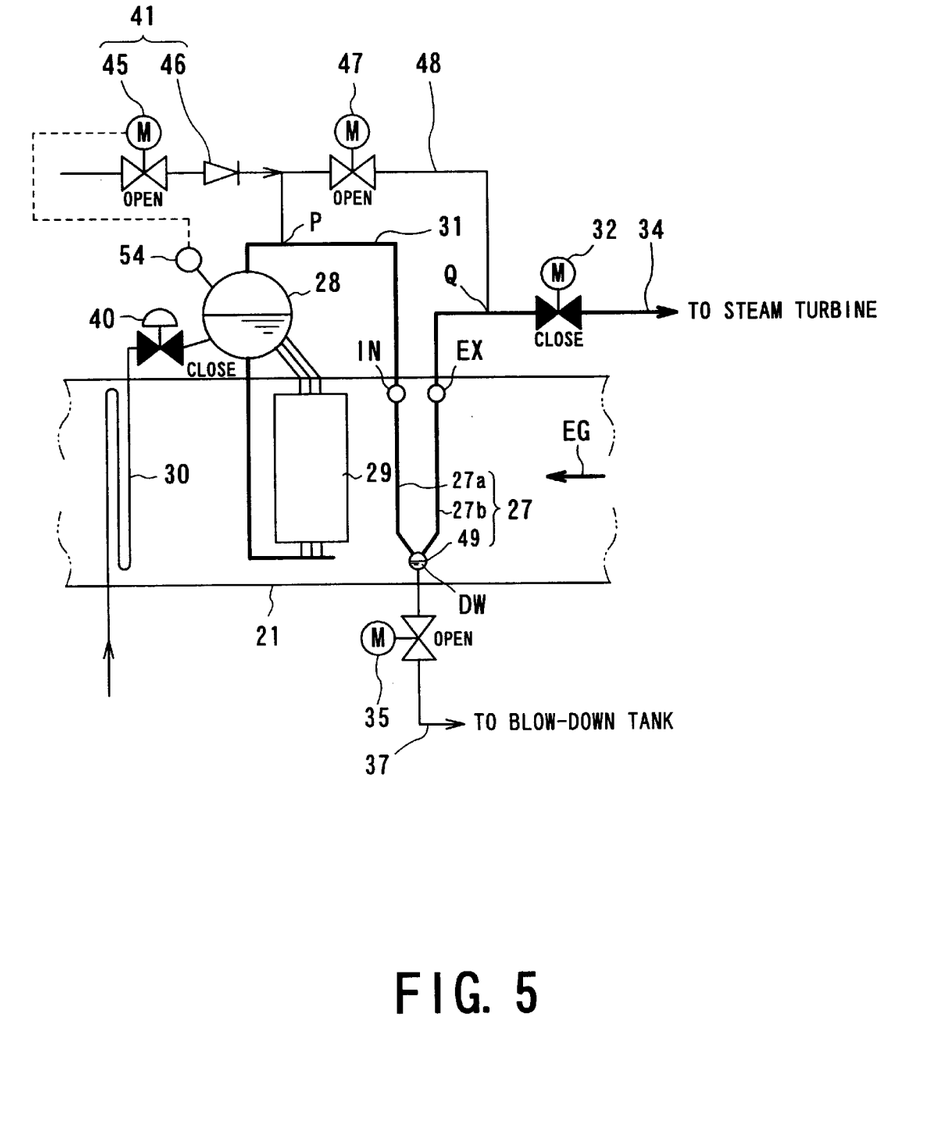
FIG. 5 is a partially cut-away block diagram showing a second modified example of the first embodiment of the heat recovery boiler of the present invention.

Furthermore, according to the described embodiment, the bottom headers 27a-BH and 27b-BH constituting the superheater 27 are mutually coupled by means of the U-shaped bottom connection pipe 27c, but not limited to this, as shown in FIG. 5, for instance, the lower portions of the pipe lines 27a, 27b may be formed as a common bottom header 49. In the case of this common bottom header 49, the volume thereof is made large and the pressure loss of the drain water DW can be recovered, thus being effective in suppressing the hammering of the drain water DW.

Figure 6:
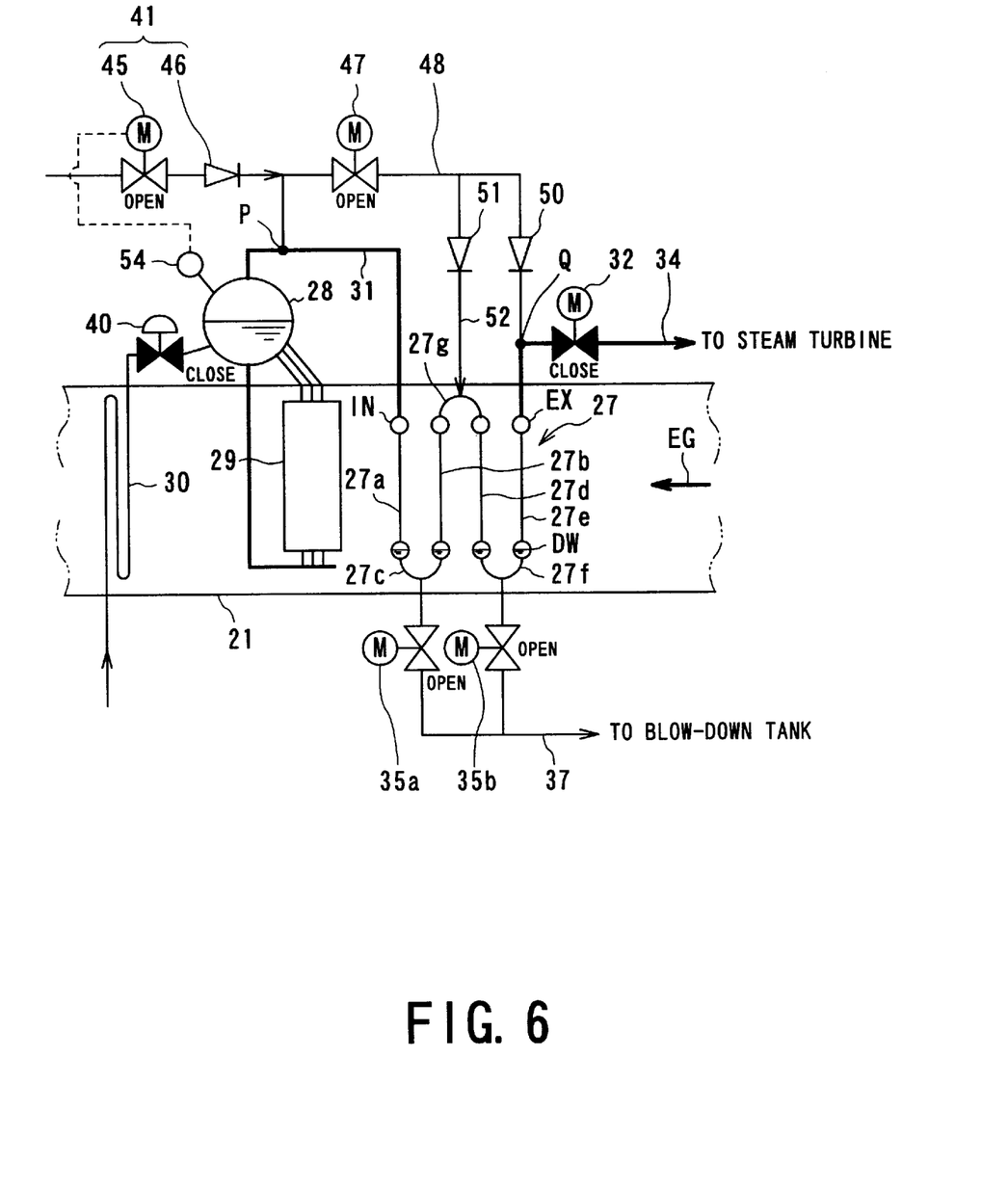
FIG. 6 is a partially cut-away block diagram showing a second embodiment of a heat recovery boiler according to the present invention.

FIG. 6 is a schematic block diagram showing a second embodiment of a heat recovery boiler of the invention. Same components as in the first embodiment are identified with same reference numerals.

In the heat recovery boiler of the embodiment, a superheater 27 is composed of, for example, four or more straight pipe lines 27a, 27b, 27d, and 27e, and the bottoms of the pipe lines 27a, 27b, 27d, and 27e are linked with U-shaped bottom communication pipes 27c, 27f, respectively, and the pipe lines 27b, 27d are combined by a U-shaped head connection pipe 27g totally in a meandering arrangement. A lead (communication) pipe 31 provided at the inlet (IN) side of the superheater 27 and a superheated steam pipe 34 provided at the outlet (EX) side of the superheater 27 are operatively connected at connection end portions P and Q through a superheater bypass pipe 48 which is incorporated with a superheater bypass valve 47 and a check valve 50, while a superheater intermediate bypass pipe 52 is provided through a superheater intermediate check valve 51 for preventing sheet pass of steam by connecting to the head connection pipe 27 in the intermediate portion of the superheater 27 passing through the superheater bypass pipe 48.

The superheater intermediate bypass pipe 52 may be connected to the connection end P through other bypass valve in place of the branched arrangement thereof from the downstream side of the superheater bypass valve 47 with no check valve 51.

In the heat recovery boiler of the described embodiment, if the saturated steam pressure of the steam drum 28 is lower than the predetermined set pressure, a non-condensable gas stop valve 45 is opened, and it is pushed out by the non-condensable gas. Further, the pipe lines 27a, 27b, ..., the bottom connection pipes 27c, 27f, and the head connection pipe 27g are assembled in a panel.

Thus, according to this embodiment, the superheater bypass valve 47 and the superheater bypass pipe 48 with the check valve 50 are provided for connecting the lead pipe 31 provided at the inlet (IN) side of the superheater 27 and the superheated steam pipe 34 provided at the outlet (EX) side of the superheater 27 at the connection end portions P and Q. Moreover, there is provided the superheater intermediate bypass pipe 28 with the check valve 51 separated from the intermediate portion of the superheater bypass pipe 48 and connected to the intermediate portion of the superheater 2, and at least either one of the saturated steam in the steam drum 28 and the non-condensable gas from the non-condensable gas system 41 is supplied into the inlet (IN) side, intermediate portion, and the outlet (EX) side of the superheater 27 through the lead pipe 31, the superheater bypass pipe 48, and the superheater intermediate bypass pipe 58, thereby applying a pressing force to the drain water DW collected in the bottom of the inlet (IN) side, the intermediate portion and the outlet (EX) side of the superheater 27. Therefore, at the time of releasing the hot banking, the drain water DW collected in the bottom of the superheater 27 can be easily blown out into the blow-down tank 36 from the drain valves 35a, 35b and the drain pipe 37, so that generation of the hammering due to the drain water DW is suppressed.

Figure 7:
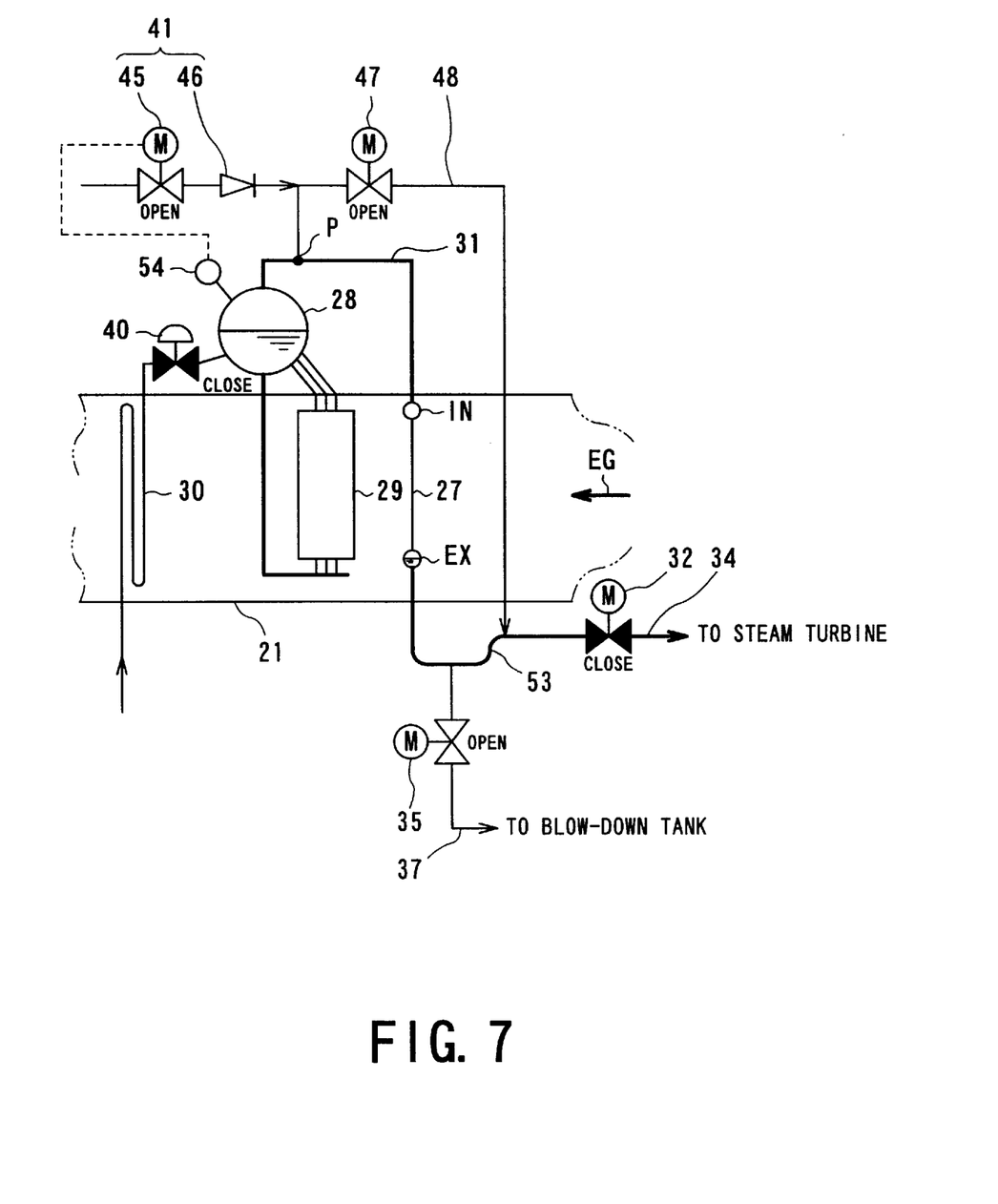
FIG. 7 is a partially cut-away block diagram showing a third embodiment of a heat recovery boiler according to the present invention.

FIG. 7 is a schematic block diagram showing a third embodiment of a heat recovery boiler of the present invention. Same components as in the first embodiment are identified with same reference numerals.

In the heat recovery boiler of this third embodiment, a superheater 27 has one pass of flow of saturated steam and its inlet (IN) side and outlet (EX) side are composed of one panel. A riser 53 is provided in the pipe line at its outlet (EX) side so as to form a drain pump and is connected to a superheated steam pipe 34. Further, a lead pipe 31 provided at the inlet (IN) side of the superheater 27 and a superheated steam pipe 34 provided at the outlet (EX) side of the superheater 27 with the riser 53 are connected, same as in the first embodiment, by a superheater bypass pipe 48 with a superheater bypass valve 47 and a non-condensable gas system 41. The other components are the same as those of the first embodiment, and their description is hence omitted herein.

Thus, in this embodiment, the superheater 27 is composed of one panel between the inlet (IN) side and the outlet (EX) side so as to form one pass of flow of the saturated steam, and the superheater bypass pipe 48 is provided for mutually connecting the lead pipe 31 provided at the inlet (IN) side of the superheater 27. The superheated steam pipe 34 with the riser 53 arranged at its outlet (EX) side, and the saturated steam in the steam drum 28 is supplied, together with the non-condensable gas from the non-condensable gas system 41, into the riser 53 at the inlet (IN) side and outlet (EX) side of the superheater 27 through the lead pipe 31 and superheater bypass pipe 48, thereby applying a pressing force to the drain water DW collected in the bottom of the riser 53 at the inlet (IN) side and outlet (EX) side of the superheater 27. Therefore, the drain water DW collected in the bottom of the superheater 27 can be easily blown out into the blow-down tank 36 through the drain valve 35 and drain pipe 37 to suppress generation of the hammering of the drain water DW.

Figure 8:
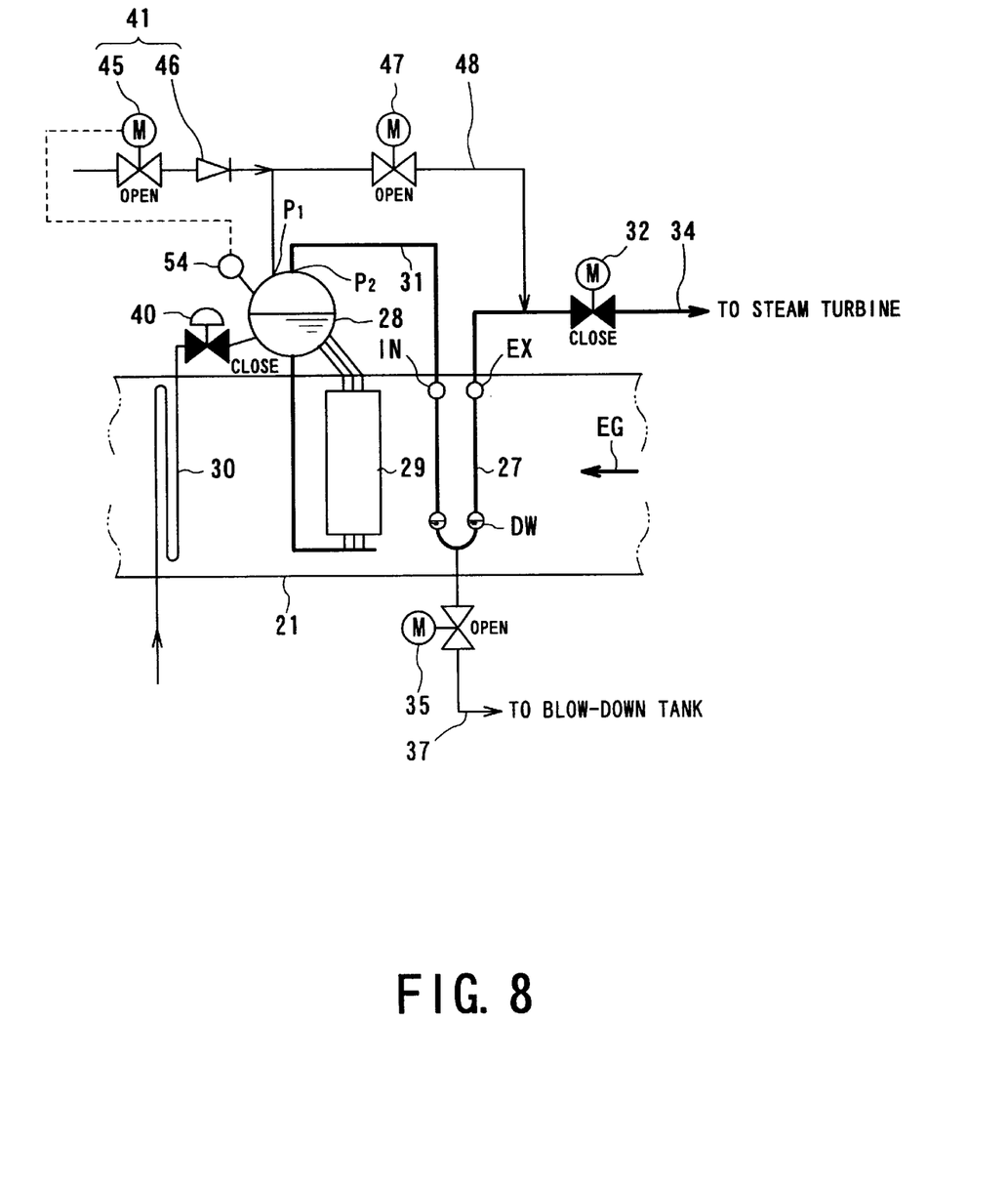
FIG. 8 is a partially cut-away block diagram showing a fourth embodiment of a heat recovery boiler according to the invention.

FIG. 8 is a schematic block diagram showing a fourth embodiment of a heat recovery boiler according to the present invention. Same components as in the first embodiment are identified with the same reference numerals.

In the heat recovery boiler of the fourth embodiment, an inlet end P1 of the superheater bypass pipe 48 having the superheater bypass valve 47 for mutually connecting the steam drum 28 and the superheated steam pipe 24 provided at the outlet (EX) side of a superheater 27 is directly connected to the steam drum 28. The other constitution thereof is the same as that in the foregoing embodiments. Reference numeral P2 shows the steam drum 28 side communication portion (inlet end) of the lead pipe 31.

Thus, in this embodiment, the inlet end P1 of the superheater bypass pipe 48 mutually connecting the steam drum 28 and the superheated steam pipe 34 provided at the outlet (EX) side of the superheater 27 and the inlet end P2 of the lead pipe 31 mutually connecting the steam drum 28 and the inlet (IN) side of the superheater 27 are connected to the steam drum 28 at different positions. Furthermore, when the pressure of the saturated steam generated from the steam drum 28 is low, the non-condensable gas from the non-condensable gas system 41 is applied as a pressing force to the inlet (IN) and outlet (EX) side of the superheater 27. Therefore, the drain water DW collected in the bottom of the superheater 27 can be easily blown out into the blow-down tank 36 through the drain valve 35 and the drain pipe 37 to suppress the generation of the hammering of the drain water DW.

As described above, according to the heat recovery boiler and the hot banking releasing method of the present invention, at the time of the the hot banking release, since the saturated steam generated from the steam drum is applied as pressing force to the drain water collected in the bottom of the inlet side and outlet side of the superheater, the drain water collected in the bottom of the superheater can be easily blown out, and the generation of the hammering of the drain water can be suppressed.

Furthermore, when the pressure of the saturated steam generated from the steam drum is low, non-condensing gas is applied as pressing force to the drain water collected in the bottom of the inlet side and the outlet side of the superheater, and therefore, the drain water collected in the bottom of the superheater can be securely blown out, and the generation of the hammering of the drain water can be suppressed.

It is to be noted that the present invention is not limited to the described embodiments and many other changes and modifications may be made without departing from the scopes of the appended claims.

What is claimed is:

1. A heat recovery boiler having an inlet side operatively connected to a combustion system and an outlet side operatively connected to an exhaust system, comprising:

a casing;

a superheater constituted by a pipe line in form of heat transfer pipe;

an evaporator provided with a steam drum;

an economizer, said superheater, said evaporator and said economizer being operatively arranged in the casing along a flow of an exhaust gas from the combustion system;

a lead pipe connecting an inlet side of the pipe line constituting the superheater to the steam drum;

a superheated steam pipe line connecting an outlet side of the pipe line constituting the superheater to the steam drum of the evaporator;

a drain pipe operatively connected to the pipe line constituting the superheater; and a superheater bypass pipe incorporated with a superheater bypass valve and having one end operatively connected to the steam drum and another one end operatively connected to the superheated steam pipe.

2. A heat recovery boiler according to claim 1, wherein said pipe line constituting the superheater is composed of at least two pipe sections which are connected to each other by means of a U-shaped connection pipe at bottom portions thereof in an installed state of the boiler.

3. A heat recovery boiler according to claim 2, wherein at least one of said pipe line and said U-shaped connection pipe is assembled in a panel in shape of a form.

4. A heat recovery boiler according to claim 1, wherein the one end of the superheater bypass pipe is directly connected to the steam drum.

5. A heat recovery boiler according to claim 1, wherein the one end of the superheater bypass pipe is indirectly connected to the steam drum by way of a non-condensable gas system.

6. A heat recovery boiler having an inlet side operatively connected to a combustion system and an outlet side operatively connected to an exhaust system, comprising:

a casing;

a superheater constituted by a pipe line in form of a heat transfer pipe;

an evaporator provided with a steam drum;

an economizer, said superheater, said evaporator and said economizer being operatively arranged in the casing along a flow of an exhaust gas from the combustion system;

a lead pipe connecting an inlet side of the pipe line constituting the superheater to said steam drum;

a superheated steam pipe line connecting an outlet side of the pipe line constituting the superheater to the steam drum of the evaporator;

a drain pipe operatively connected to the pipe line through a bottom connection pipe;

a superheater bypass pipe incorporated with a superheater bypass valve, said pipe line constituting the superheater being composed of one straight pipe line, said straight pipe line having an outlet side being connected to the superheated steam pipe through a connection portion which is arranged at a portion downstream side of a connection portion between the drain pipe and the bottom connection pipe, said connection portion between the superheated steam pipe and said pipe line being formed with a rising portion; and said superheater bypass pipe having one end operatively connected to said steam drum and another one end operatively connected to a portion downstream side of said rising portion.

7. A heat recovery boiler according to claim 6, wherein at least one of said pipe line and said bottom connection pipe is assembled in a panel in shape of a form.

8. A heat recovery boiler according to claim 6, wherein the one end of the superheater bypass pipe is directly connected to the steam drum.

9. A heat recovery boiler according to claim 6, wherein the one end of the superheater bypass pipe is indirectly connected to the steam drum by way of a non-condensable gas system.

10. A heat recovery boiler having an inlet side operatively connected to a combustion system and an outlet side operatively connected to an exhaust system, comprising:
   a casing;
   a superheater constituted by a pipe line in form of a heat transfer pipe;
   an evaporator provided with a steam drum;
   an economizer, said superheater, said evaporator and said economizer being operatively arranged in the casing along a flow of an exhaust gas from the combustion system;
   a lead pipe connecting an inlet side of the pipe line constituting the superheater to the steam drum;
   a superheated steam pipe line connecting an outlet side of the pipe line constituting the superheater to the steam drum of the evaporator;
   a drain pipe operatively connected to the pipe line constituting the superheater; and
   a superheater bypass pipe incorporated with a superheater bypass valve and having one end operatively connected to the steam drum and another one end operatively connected to the superheated steam pipe,
   said pipe line being composed of at least four pipe line sections which are connected by means of head connection pipes and bottom connection pipes respectively at head side portions and bottom side portions of the pipe line sections totally in a meandering fashion; and
   said pipe line being incorporated with a superheater intermediate bypass pipe through which at least one of saturated steam and non-condensable gas is supplied.

11. A heat recovery boiler according to claim 10, wherein at least one of said pipe line, said head connection pipes and said bottom connection pipes is assembled in a panel in shape of a form.

12. A heat recovery boiler according to claim 10, wherein the one end of the superheater bypass pipe is directly connected to the steam drum.

13. A heat recovery boiler according to claim 10, wherein the one end of the superheater bypass pipe is indirectly connected to the steam drum by way of a non-condensable gas system.

14. A hot banking releasing method of a heat recovery boiler, which has an inlet side operatively connected to a combustion system and an outlet side operatively connected to an exhaust system and which comprises: a casing; a superheater constituted by a pipe line in form of a heat transfer pipe; an evaporator provided with a steam drum; an economizer, said superheater, said evaporator and said economizer being operatively arranged in the casing along a flow of an exhaust gas from the combustion system; a lead pipe connecting an inlet side of the pipe line constituting the superheater to the steam drum; a superheated steam pipe line connecting an outlet side of the pipe line constituting the superheater to the steam drum of the evaporator; a drain pipe operatively connected to the pipe line constituting the superheater; and a superheater bypass pipe incorporated with a superheater bypass valve and having one end operatively connected to the steam drum and another one end operatively connected to the superheated steam pipe,
   the hot banking releasing method being for enclosing exhaust gas from the combustion system in the casing and releasing the hot banking while maintaining feed water in the casing at a high temperature, and
   said hot banking releasing method comprising the steps of:
   opening the superheater bypass valve incorporated to the superheater bypass pipe;
   opening a drain valve provided for the drain pipe;
   applying a pressing force to water collected in the bottom of said superheater by passing saturated steam generated from the steam drum through the lead pipe and the superheater bypass pipe; and
   blowing drain water out of a plant through the drain valve.

15. A hot banking releasing method of a heat recovery boiler, which has an inlet side operatively connected to a combustion system and an outlet side operatively connected to an exhaust system and which comprises: a casing; superheater constituted by a pipe line in form of a heat transfer pipe; an evaporator provided with a steam drum; an economizer, said superheater, said evaporator and said economizer being operatively arranged in the casing along a flow of an exhaust gas from the combustion system; a lead pipe connecting an inlet side of the pipe line constituting the superheater to the steam drum; a superheated steam pipe line connecting an outlet side of the pipe line constituting the superheater to the steam drum of the evaporator; a drain pipe operatively connected to the pipe line constituting the superheater; and a superheater bypass pipe incorporated with a superheater bypass valve and having one end operatively connected to the steam drum by way of a non-condensable gas system and another one end operatively connected to the superheated steam pipe,
   said hot banking releasing method being for enclosing exhaust gas from the combustion system in the casing and releasing the hot banking while maintaining feed water in the casing at a high temperature, and
   said hot banking releasing method comprising the steps of, at a time when a saturated steam pressure of a steam drum is less than a predetermined set pressure:
   opening a valve provided for the non-condensable gas system;
   branching the inlet side of the superheater from the communication pipe connected to the steam drum;
   opening the superheater bypass valve incorporated to the superheater bypass pipe;
   opening a drain valve provided for the drain pipe provided in the bottom of the superheater;
   applying a pressing force to drain water collected in the bottom of said superheater by passing a non-condensable gas from the non-condensable gas system through the lead pipe and the superheater bypass pipe;
   blowing drain water out of a plant through the drain valve;
   closing the valve of the non-condensable gas system;
   closing again the drain valve temporarily; and
   blowing the non-condensable gas out of the system through the drain valve.

* * * * *